(12) United States Patent
Choyi et al.

(10) Patent No.: US 8,769,682 B2
(45) Date of Patent: Jul. 1, 2014

(54) MECHANISM FOR IDENTIFYING MALICIOUS CONTENT, DOS ATTACKS, AND ILLEGAL IPTV SERVICES

(75) Inventors: Vinod K. Choyi, Ottawa (CA); Pierrick Guingo, Aylmer (CA); Faud A. Khan, Osgoode (CA)

(73) Assignee: Alcatel Lucent, Paris (FR)

( * ) Notice: Subject to any disclaimer, the term of this patent is extended or adjusted under 35 U.S.C. 154(b) by 1034 days.

(21) Appl. No.: 12/233,561

(22) Filed: Sep. 18, 2008

(65) Prior Publication Data

US 2010/0071062 A1    Mar. 18, 2010

(51) Int. Cl.
*H04L 29/06* (2006.01)
*H04L 12/24* (2006.01)

(52) U.S. Cl.
CPC ........ *H04L 63/1408* (2013.01); *H04L 63/1441* (2013.01); *H04L 41/0213* (2013.01)
USPC ............................................. 726/23; 709/223

(58) Field of Classification Search
CPC .................. H04L 63/1408; H04L 63/1441
USPC ................. 726/13, 22, 23; 370/352; 709/223
See application file for complete search history.

(56) References Cited

U.S. PATENT DOCUMENTS

| | | | | |
|---|---|---|---|---|
| 6,411,616 | B1 * | 6/2002 | Donahue et al. | 370/352 |
| 2004/0093513 | A1 * | 5/2004 | Cantrell et al. | 713/201 |
| 2006/0075084 | A1 * | 4/2006 | Lyon | 709/223 |
| 2008/0028463 | A1 * | 1/2008 | Dagon et al. | 726/22 |
| 2008/0060026 | A1 * | 3/2008 | Cheung et al. | 725/81 |
| 2010/0043067 | A1 * | 2/2010 | Varadhan et al. | 726/13 |

* cited by examiner

*Primary Examiner* — Jeffrey Pwu
*Assistant Examiner* — Thong Truong
(74) *Attorney, Agent, or Firm* — Garlick & Markison

(57) ABSTRACT

Mechanism for identifying malicious content, DoS attacks, and illegal IPTV services. By monitoring the characteristics of various control messages being transmitted within a network that services Internet protocol television (IPTV) content to identify suspicious behavior (e.g., such as that associated with malicious content, denial of service (DoS) attacks, IPTV service stealing, etc.). In addition to monitoring control messages within such a network, deep packet inspection (DPI) may be performed for individual packets within an IPTV stream to identify malicious content therein (e.g., worms, viruses, etc. actually within the IPTV stream itself). By monitoring control messages and/or actual IPTV content within a network (e.g., vs. at the perimeter of a network only), protection against both outside and inside attacks can be effectuated. This network level basis of operation effectively guards against promulgation of malicious content to other devices within the network.

20 Claims, 6 Drawing Sheets

US 8,769,682 B2

MECHANISM FOR IDENTIFYING MALICIOUS CONTENT, DOS ATTACKS, AND ILLEGAL IPTV SERVICES

BACKGROUND OF THE INVENTION

1. Technical Field of the Invention

The invention relates generally to network security; and, more particularly, it relates to providing security within networks whose content includes Internet protocol television (IPTV) streams.

2. Description of Related Art

Internet protocol television (IPTV) is a service that is gaining evermore acceptance and popularity. One of the benefits of such IPTV services is that they can be delivered via an existing network that is already implemented and capable to service a number of other services (e.g., the Internet itself or a network operating in accordance with the transmission control protocol/Internet protocol (TCP/IP) protocol suite or such Internet compliant protocol). Originally, IPTV services were provided via unicast, but broadcast IPTV services are now gaining traction in the market place. By piggy-backing on such an existing network (e.g., the Internet), IPTV services can effectively be provided to a very broad range and high number of subscribers.

However, by provisioning such IPTV services on such an existing network (e.g., the Internet), these IPTV services, like many others that are provided via an existing network, are susceptible to many new attacks by hackers. There do exist some prior art approaches that attempt to ensure security of such IPTV services, but these existing solutions generally are geared towards providing rudimentary mechanisms to protect the IPTV system itself (e.g., generally using a perimeter of defense model), and they do not operate pro-actively to enable protection for internal/inside attack events such as denial of service (DoS) attacks and illegal IPTV services (e.g., service stealing, etc.).

These prior art approaches for IPTV network security typically employ mechanisms such as firewalls and access control lists perhaps along with some limited intrusion prevention mechanism. Again, these prior art approaches generally operate only to provide a perimeter of defense around the IPTV network. However, typical prior art approaches, in attempting to provide this perimeter of defense, still fail to provide adequate protection for outside attack and are susceptible thereto. Moreover, such prior art approaches provide no robust mechanism whatsoever to protect against insider attacks such as denial of service (DoS) attacks and illegal IPTV services (e.g., service stealing, etc.).

BRIEF SUMMARY OF THE INVENTION

Various aspects of the invention may be found in an apparatus that includes a processing module and a memory device. The memory may be integrated with the processing module, or separately implemented and in communication with one another. Such an apparatus may be any device coupled to or capable to interacting with a network (e.g., a server device, a router device, etc.) such as a network in which IPTV services are provided. In certain embodiments, such an apparatus may generally be referred to as a security appliance.

The processing module operates by monitoring control messages sent between various devices within the network. The processing module analyzes the control messages to identify parameter characteristics therein. A memory may include parameter characteristics to which the analyzed parameter characteristics are compared. When there is sufficient indication that the control messages are suspicious (e.g., suspicious or anomalous characteristic of a control message), then the processing module can perform any of a number of various security actions. In one instance, the processing module blocks any future control message sent from the device. In another instance, the processing module blocks IPTV streams from being broadcast to the offending device. Alternatively, the processing module operates to continue monitoring control messages (e.g., if there is not yet sufficient confidence that the possibly offending device is an attacker).

Any of a number of control messages within a network may be monitored (Internet Group Message Protocol (IGMP) messages, Customer premise Management System (CMS) messages, etc.).

It is also noted that actual content/packets of various IPTV streams may be processed and analyzed (e.g., using deep packet inspection (DPI)) to identify potentially malicious content therein.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
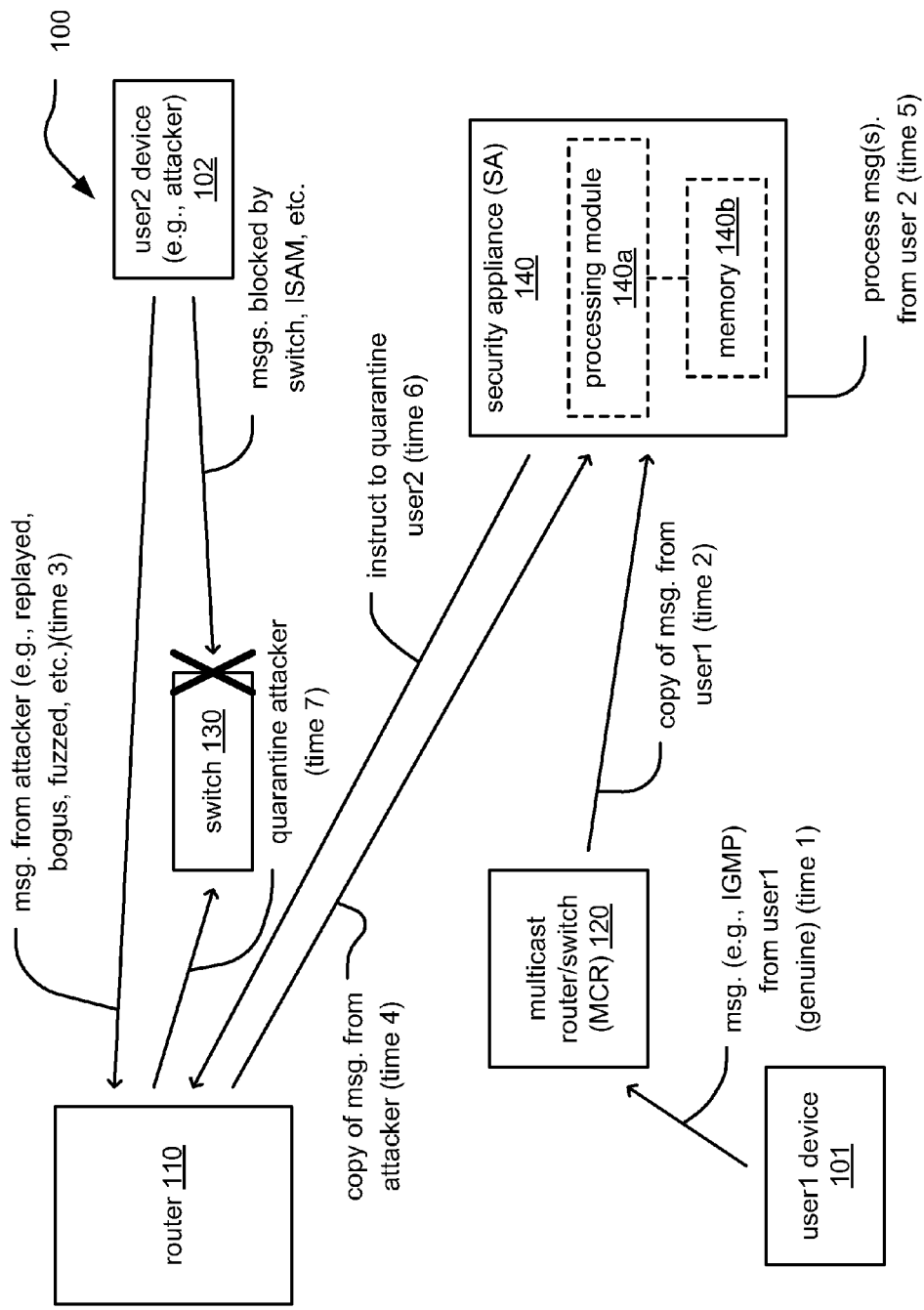
FIG. 1 is a diagram illustrating an embodiment of a network that services Internet Protocol Television (IPTV) content.

A novel security mechanism is presented herein that protects a network servicing Internet Protocol Television (IPTV) streams from internal as well as external attacks. Whereas prior art approaches are incapable of dealing with insider attacks such as denial of service (DoS) attacks and illegal IPTV services (e.g., service stealing, etc.), the security mechanisms presented herein allow protection of an IPTV network's infrastructure (e.g., keeping devices therein from being infected with malicious programs such as worms, trojans, viruses, malware, spyware, BOTs (or botnets), etc.). In addition, the security mechanisms presented herein can protect an IPTV service provider's investment by preventing theft of IPTV services by insiders (e.g., legitimate subscribers of IPTV content who may steal and/or re-sell their legitimately acquired IPTV content to non-subscribers). Not only do the security mechanisms presented herein provide for protection of an IPTV network from both internal and external attack, but they also provide for stemming the promulgation of malicious programs outside of the network.

Pro-active security mechanisms for the monitoring of IP multicast groups carrying broadcast TV channels (e.g., IPTV services) is employed, and when suspicious activity is detected, then appropriate actions may be taken. For example, when an intrusion prevention system (IPS) (e.g., which may be implemented, at least in part, using a security appliance (SA) in accordance with an embodiment as described herein) encounters suspicious behavior, then appropriate actions may be taken pro-actively to perform any of a number of desired security actions such as blocking control messages to and/or from a suspected infected device, blocking an IPTV stream from being broadcast, continuing to monitor an IPTV stream, continuing to monitor control messages, and/or some other security action, etc.

One mechanism by which security functions may be effectuated is for the IPS to subscribe to the same multicast groups that are being subscribed by users. This way, the IPS has access to and can monitor the content within the very same IPTV streams to which users as exposed. To perform accurate inspection of the individual packets within an IPTV stream, deep packet inspection (DPI) can be employed by the IPS. Currently, DPI has the ability to perform packet inspection up to Layer-7 at near line speed using various techniques (e.g., signature-based worm detection, anomaly-based worm detection, a hybrid thereof, or some other technique). In addition, anti-virus, anti-spyware, and other functions can also be performed within such an IPS.

From one perspective, an IPS does have functionality analogous to a firewall, in that, an IPS is generally employed for perimeter or border protection (i.e., used to prevent attacks from the outside of the network). However, the use of a security appliance (SA), as presented herein, allows also for protection against inside/internal attacks on an operators IPTV network (or other network type) including such internal attacks that may originate from or through actual IPTV subscribers. While the novel security mechanisms presented herein can be implemented in conjunction with certain existing security mechanisms (e.g., an intrusion prevention system (IPS) and/or intrusion detection system (IDS)), these novel security mechanisms allow the ability to provide protection against insider/internal attacks in an operator's IPTV network (or other network) [which existing security mechanisms do not provide for].

Various types of control messages are referred to herein (e.g., Internet Group Message Protocol (IGMP) messages, Customer premise Management System (CMS) messages, etc.). It is noted that sometimes, in the art, these IGMP messages may alternatively be referred to as Internet Group Management Protocol messages, Internet Gateway Management Protocol messages, or Internet Gateway Message Protocol messages; any such terminology may be employed without departing from the scope and spirit of the invention. Generally, such IGMP messages (regardless of particular acronym nomenclature) are employed to effectuate channel changes and other functions associated with controlling one or more IPTV streams (e.g., selecting a particular channel within one of the IPTV streams, etc.). Analogously, CMS messages may be viewed as those control messages employed within certain residential gateway management protocols such as that employed by 2Wire).

FIG. 1 is a diagram illustrating an embodiment 100 of a network that services Internet protocol television (IPTV) content. There are a variety of types of attacks that may be made to such a network. For example, denial of service (DoS) attacks may be made as fuzzed and/or replayed control messages (e.g., of any type of control message including IGMP, CMS, etc.) in which a high number of control messages are flooded to a residential gateway (through which the IPTV services flow). Such DoS attacks have a direct impact on the performance of the overall content view ability, the ability of a user to effectuate channel changes, etc.

As can be seen in this diagram, a security appliance (SA) 140, which may include a processing module 140a and a memory 140b, is implemented to enable protection from inside/internal attacks. In contrast to an IPS, which operates to ensure a perimeter of defense around a network to stem attacks originating from an external network (e.g., the Internet), the SA 140 operates within the framework of the existing network in which a user device is also implemented. Also, by using such an implementation of an SA 140 as depicted herein, even if an actual, legitimate IPTV service subscriber (i.e., within an internal network) has malicious intentions and performs an inside/internal attack on the system, the SA 140 can identify and/or defeat such attacks. By employing DPI of packets within any desired IPTV stream, the SA 140 can identify attacks based on certain signatures, anomalous behavior, etc. that may be associate with when a user is sending a malicious control message and/or packet within the network (including within an internal network to which only actual, legitimate IPTV service subscribers typically have access).

Considering this diagram, a user1 device 101 sends a genuine control message to a multicast router/switch (MCR) 120 during time 1. Such a control message may be to make a change channel to another IPTV stream included in the services to which the user1 subscribes. This control message is provided to a router 110 (e.g., a server or other device through which IPTV services flow), and a copy of this control message is also sent to the SA 140 during time 2. The SA 140 may create an entry for the control message in a databases (e.g., in memory 140b) to identify the user1 address uniquely, the port from which such control message came, information corresponding to the MCR 120 from which through which the control message came, and/or any other information such as which may be included within the control message. The SA 140 may also check the total number and frequency of any control messages from such user1. In one instance, because the user1 is an actual, legitimate IPTV service subscriber known to the IPTV service operator/provider, all control messages sent to/from user1 device 101 are automatically provided also to the SA 140.

Consider a situation when a malicious user2/attacker sends a control message to the router 110 during time 3 (control message from user2 device 102 to router 110). Such an attacker may replay control messages (originally provided from himself or as captured from other users), or may perform other brute-force type attacks. For example, the user2/attacker may spoof an actual, legitimate user's unique address (by first snooping on that user's messages) thereby potentially causing service disruption to that user and/or perform a complete DoS attack.

The router 110 then provides a copy of this message from the user2/attacker to the SA 140 during a time 4. The SA 140 then performs processing of control messages (e.g., one or both of the control messages provided from user1 and user2/attacker) during a time 5. If the control message(s) provided from user2/attacker is deemed to include parameter characteristics that make is suspicious to a sufficient degree, then the SA 140 can perform any number of operations to protect the IPTV service provider as well as other users of the network. For example, the SA 140 can check this particular control message and compare it to the port and address from which it is expected to arrive (e.g., as within the database which may be implemented in memory 140b). If such parameter characteristics do not correspond according to the information within the database of the SA 140, then the SA 140 can take one or more appropriate protective measures.

The SA 140 can provide an instruction to a proxy device such as the router 110 (during time 6) so that the user2/attacker is quarantined from the network. For example, a switch 130 can be switched to cut the user2/attacker completely off from the network during time 7. Such instruction to the switch 130 can come directly from the SA 140 or via the router 110.

This can be effectuated by blocking any future control messages from the user2/attacker, by blocking any IPTV services from being provided to the user2/attacker, etc. In another situation, perhaps the SA 140 determines, in processing a control message from user2/attacker, that user2/attacker is a potential attacker (though not to a sufficiently high degree of certainty), the SA 140 can continue to monitor control message provided by user2/attacker. For example, perhaps there is at least one suspicious or anomalous characteristic of a control message sent from user2/attacker, but perhaps it is not of a sufficiently high degree as to cross a threshold by which the user2/attacker is identified as a true attacker, then the SA 140 may place the user2/attacker into a higher category of scrutiny, so that if and when an additional control message from user2/attacker also has at least one suspicious or anomalous characteristic, then the user2/attacker is at that point identified to be a true attacker; at that point, then protection measures may be taken against the user2/attacker.

As mentioned above, there are a variety of types of control message (IGMP, CMS, etc.) that may be employed within such a network that operates using IPTV services therein. The functionality of this embodiment 100 may be employed for any such types of control messages without departing from the scope and spirit of the invention.

A memory 140b of the SA 140 may store various parameter characteristics that may be used by the processing module 140a therein to analyze control message. When certain parameter characteristics of a control message correspond to one or more of the stored parameter characteristics (e.g., in the memory 140b), then the SA 140 can make an informed determination as to whether control messages indicate an attack (e.g., a protective measure need be taken), possibly an attack (e.g., further monitor is needed), or the control messages are benign.

One example of a parameter characteristic includes a number of control messages sent per unit of time by a user. The SA 140 can keep track of the number of control message counts/second, and any deviation from this typical number (e.g., by some predetermined or adaptively determined threshold) may raise a red flag to indicate a potential flooding type attack. That is to say, another example of a parameter characteristic includes a deviation of the number of control messages sent per unit of time from an expected number of control messages sent per unit of time.

Another example of a parameter characteristic includes merely tracking the control messages sent by a residential gateway. For example, by keeping track of the number of control message counts/second on a per residential gateway basis, then any deviations from average and/or normal behavior may indicate suspicious or anomalous behavior.

Yet another example of a parameter characteristic includes tracking a re-booting process of a residential gateway. For example, if a residential gateway is being re-booted at a frequency different from a normal or expected rate, then this may indicate suspicious or anomalous behavior.

Also, it is noted that various types of control messages typically include values (e.g., bit values) therein having expected values. When values within such control messages are considered to be absurd or something as would be expected by a worm, virus, etc. for performing some type of attack (e.g., fuzzing, etc.), then this may indicate suspicious or anomalous behavior.

Another example of a parameter characteristic includes keeping track of a switch through which a control message passes when being sent to a router, MCR, or other device within the network.

Even another example of a parameter characteristic includes a history of IPTV streams received or selected by the device. For example, a channel watching history may be logged for a particular user. When a user's channel selection deviates significantly from typical usage (e.g., such as by some predetermined or adaptively determined threshold), then this may be used merely as a trigger to monitor control messages from such user with greater scrutiny. While this alone may not be sufficient to indicate that the user is an attacker, it may place that user on a list to be monitored/watched with greater scrutiny.

It is also noted that such parameter characteristics may be updated/modified over time to adapt to changed operation conditions, a user's history, or for other reasons. This way, the SA 140 can adapt to changing conditions within the network.

Based on processing such parameter characteristics of control messages against those parameter characteristics within a database (e.g., within memory 140b). Based on this analysis, the SA 140 may choose completely to block an attacker or wait for further analysis (e.g., keep monitoring that user's control messages) to confirm whether an attack is being made. It is also noted that all of this functionality as described herein, as referenced with respect to control messages, may also be applied to the actual content within an IPTV stream. That is to say, an attacker may alternative choose to insert some malicious code, program, etc. within one or more packets of an IPTV stream. The SA 140 can also perform such analysis of those packets in an effort to identify attacks and take appropriate action if detected.

As can be seen, a number of control message and/or IPTV streams are provided to the SA 140 in this diagram. It is also noted that certain optimizations and efficiencies can be made by sending such control messages from various devices multicast instead on only unicast. For example, when a control message (or copy thereof) is sent from an MCR to the SA 140, it may be more efficient to send such control messages via multicast (in which the group of the multicast indicates multiple receiving devices) vs. only unicast to each of the separate intended receiving devices.

This will reduce the amount of signaling and control messages that need to be copied and sent to various SAs that may be implemented within the network. Clearly, more than one SA may be implemented in a given network for various reasons (e.g., parallel computing, redundancy, proximity to certain devices such as users, routers, etc.). In addition, using multicast for such control messages will increase the visibility of the signaling and control messages sent to SAs from different domains so that they have a larger sample size to analyze which will effectively decrease the rate of false positive detection (e.g., identifying a user as an attacker when the user is not, or identifying a packet as including malicious content when it does not).

Implementing such multicast may be made by generating a separate multicast control group so that all control messages are copied and sent out via that multicast control group. All devices expecting or needing a copy of such control messages would then be a member of that multicast control group. For example, a certain group of SAs, IPS, IDS or other devices such as routers, servers, etc. could be members of a multicast control group to receive the same set of control messages which would then be copied into that multicast channel and provided to members of that multicast control group. Such a multicast control group could be composed of multiple senders (e.g., video servers, web services router, MCRs, etc.) and its corresponding receivers could be another set of devices (e.g., SAs, IDSs, IPSs, probes, etc.).

As a further optimization, there could be separate groups for each type of message or service such as depending on the control message type (e.g., one group for IGMP control messages, one group for CMS control messages, etc.). As an example, the following table shows a possible implementation of such multicast control groups.

| Group Id | Group | Senders | Receivers |
|---|---|---|---|
| 1 | IGMP control messages | Web service router 1, MCRs, SA/IPS/IDS, etc. | SA/IPS/IDS |
| 2 | CMS control messages | CMS server 1, SA/IPS/IDS, set top box (STB) 1, STB 2, etc. | SA/IPS/IDS |

Figure 2:
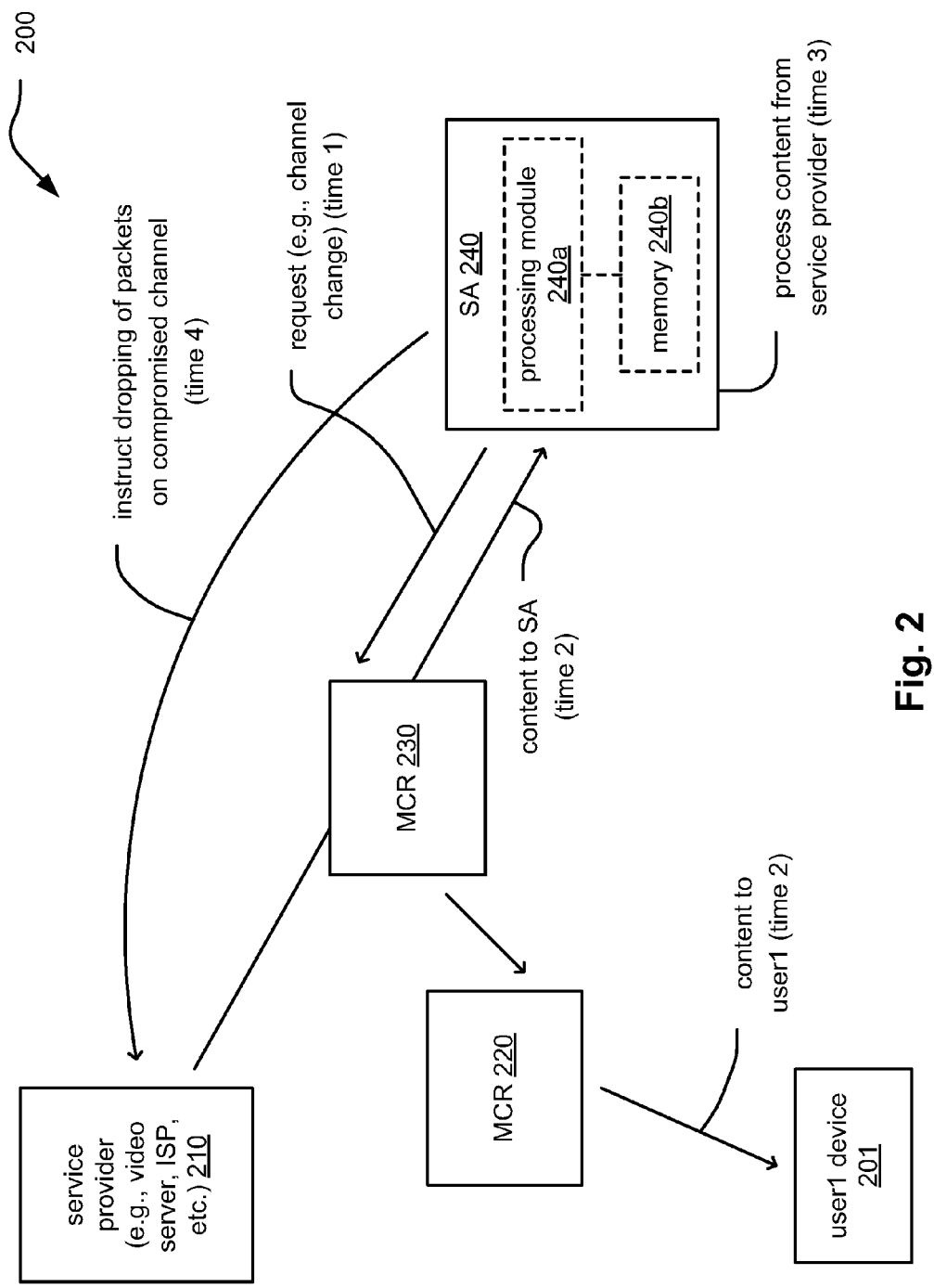
FIG. 2 is a diagram illustrating an alternative embodiment of a network that services IPTV content and includes protection from external attacks.

FIG. 2 is a diagram illustrating an alternative embodiment 200 of a network that services IPTV content and includes protection from external attacks. As mentioned above, the various functionality and operations of an SA as performed when monitoring control messages within a network may also analogously be applied to monitoring the content within one or more IPTV streams within the network (e.g., by using DPI). Moreover, it is noted that monitoring and analysis of content within one or more IPTV streams may be triggered when a user is firstly identified as being a possible attacker. For example, control message monitoring and analysis may be used to firstly identify a potential attacker, and then monitoring and analysis of content within one or more IPTV streams associated with that potential attacker (e.g., either being delivered to or sent from that potential attacker). This can be viewed as a two level approach: (1) firstly identify a possible attacker, and then (2) specifically monitor content to and/or from that possible attacker.

In this embodiment 200, an SA 240 (that also may include a processing module 240a and a memory 240b) monitors one or more sessions of IPTV provided to one or more users. The SA 240 itself may receive a multicast signal that includes the IPTV streams as well, so that it can directly perform monitoring of the IPTV streams without needing copies thereof to be send separately from another device within a network (i.e., by receiving the IPTV stream(s) of interest, the SA 240 ca perform monitoring and analysis thereof directly). As one example, if and when a particular IPTV stream (such a particular channel) is identified as possibly including malicious content, then the SA 240 would then send a control message to select that particular IPTV stream (or channel).

Moreover, the SA 240 may independently probe and monitor one or more various IPTV streams without needing to identify any such IPTV stream as possibly including malicious content. In other words, the SA 240 may probe and monitor various IPTV streams to perform random (or according to some predetermined pattern, periodic checks of various channel, etc.) checks on the content within various IPTV streams.

Considering the embodiment 200, based on an initial indication that an IPTV stream includes parameter characteristics indicating suspicious or anomalous activity (e.g., the IPTV stream possibly includes including malicious content), the SA 240 decides to monitor the content within one or more IPTV streams broadcast from service provider 210 as shown by time 1. Thereafter, the content of the selected IPTV stream is provided to the SA 240 via MCR 230 as shown by time 2, and this same content is also provided via MCR 230 and MCR 220 to user1 device 201 during time 2. During time 3, the SA 240 then processes the content (e.g., using DPI) using signature-based worm detection, anomaly-based worm detection, a hybrid thereof, or some other technique to determine whether or not the content includes malicious content therein. Upon the detection of any malicious content in the IPTV stream, the SA 240 performs any of a number of protective actions. For example, the SA 24 may instruct the service provider 210 to drop the compromised IPTV stream (or channel). Alternatively, if all IPTV streams from the service provider 210 are compromised, then the SA 240 could block all such IPTV streams from being broadcast to the devices within the network via the service provider 210.

Figure 3:
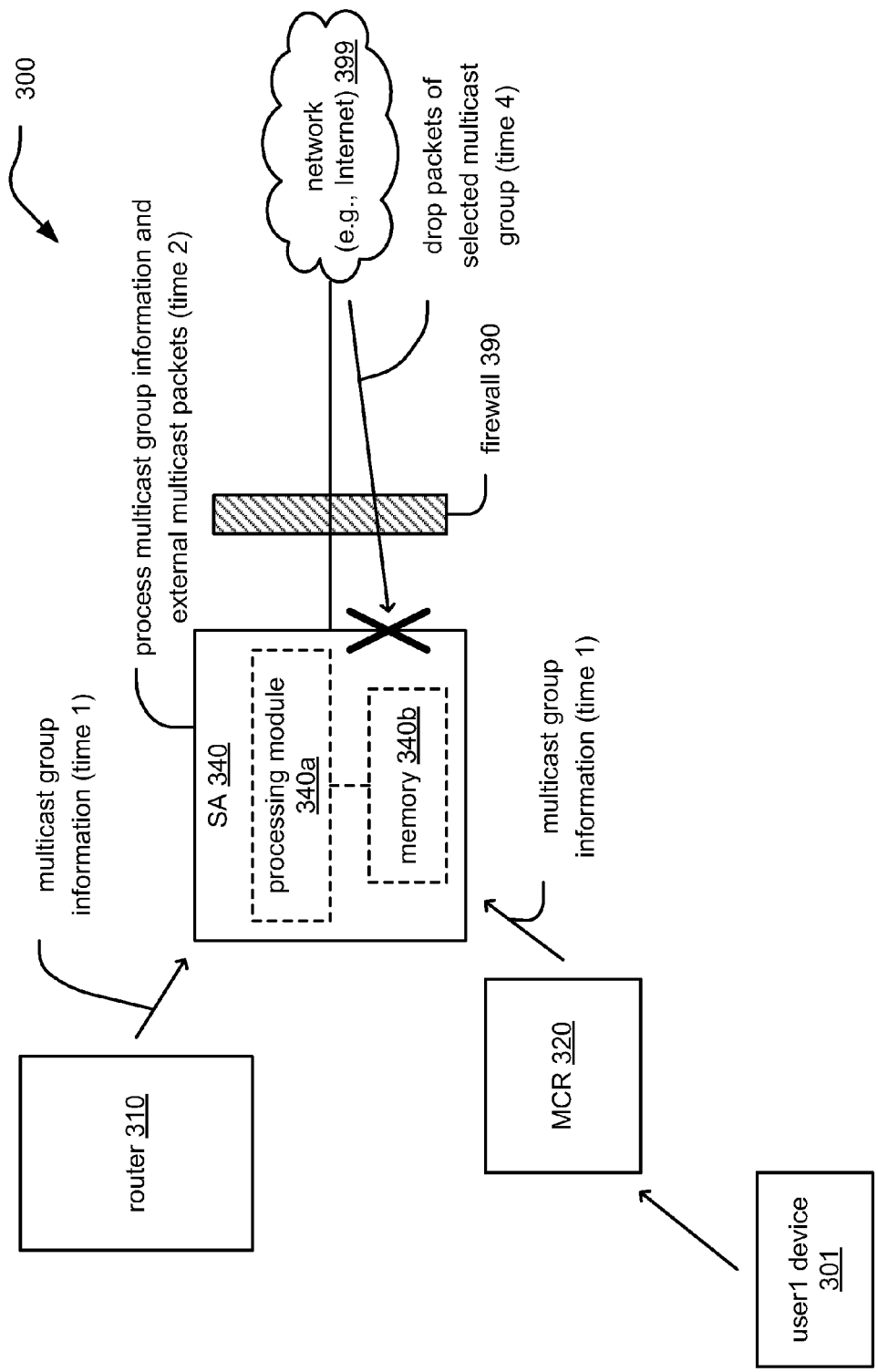
FIG. 3 is a diagram illustrating an alternative embodiment of a network that services IPTV content and includes protection from internal attacks.

FIG. 3 is a diagram illustrating an alternative embodiment 300 of a network that services IPTV content and includes protection from internal attacks. A device or application running an IPS (e.g., such as SA 340, which could include a processing module 340a and a memory 340b therein) can poll the various multicast IPTV streams provided via various content providers (e.g., servers, router 310, IGMP proxy devices, IGMP snooping devices, etc.). For example, the user1 device 301 would be included within a legitimate multicast group receiving IPTV content through MCR 320, as shown by time 1.

The SA 340 can then list all users subscribed to each of the various multicast groups. As shown by time 2, a list of the various groups within the network is then compared to the content being provided from the service provider (e.g., via router 310), via an external network 399 (such as the Internet), or via some other triple-play domain and/or network such as may be separated from the internal network by a firewall 390. If duplicate entries are identified, this could trigger a mis-configuration alarm or the detection of illegal traffic within the network. Based on such detection, the SA 340 could take appropriate security measures. In one example, the SA 340 would instruct the dropping of packets received from the network 399, as shown by time 4, when parameter characteristics of the content received from the network 399 indicate suspicious or anomalous content therein. Alternatively, the SA 340 can merely block off all such IPTV content from a particular source within the network 399 when parameter characteristics of the content received from the network 399 indicate suspicious or anomalous content therein. This diagram shows an instance where malicious content is included within an IPTV stream that does breach or pass through the firewall 390 from another network 399 (e.g., as may be implemented by an IDS/IPS), and the SA 340 operates nonetheless to ensure such malicious content does not invade the internal network.

Figure 4:
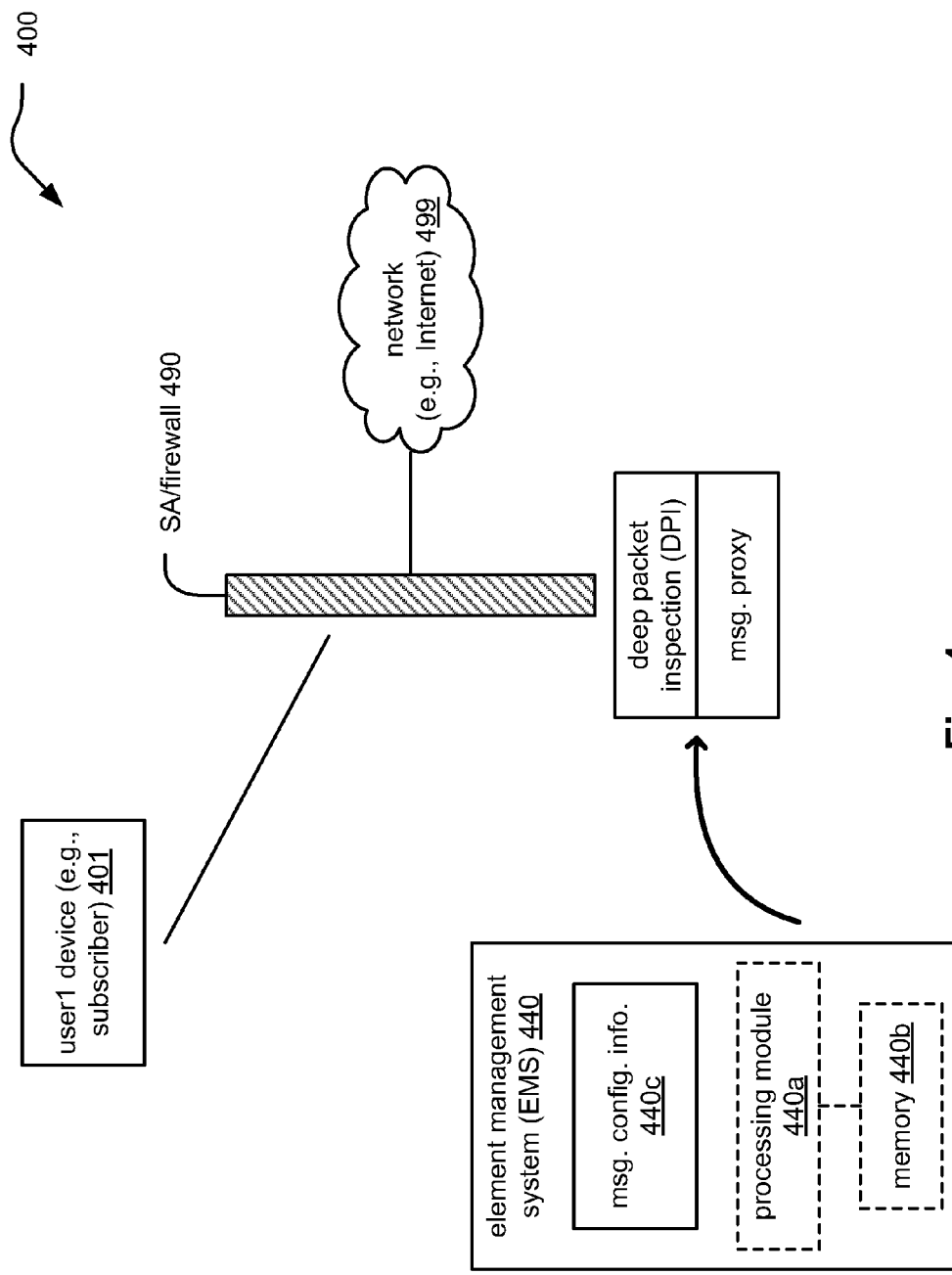
FIG. 4 is a diagram illustrating an embodiment of a network that employs an element management system (EMS) to effectuate network security.

FIG. 4 is a diagram illustrating an embodiment 400 of a network that employs an element management system (EMS) to effectuate network security. This diagram shows how subscriber access details are stored in a control message configuration library as part of an element management system (EMS) 440, as shown by reference numeral 440c. This EMS 440 may be viewed as being one possible embodiment of an IDS/IPS operating in cooperation with an SA as described in various other embodiments herein. In addition, such an EMS 440 may also include a processing module 440a and a memory 440b therein.

Such control message configuration library may be employed as a run time feed to an SA and/or firewall 490 (e.g., by also performing DPI of packets within various IPTV streams) as implemented via a message proxy mechanism. When performing DPI inspection to identify malicious content within an IPTV stream, then when a user1 device 401 (e.g., a subscriber) attempts to join that IPTV stream, then a comparison is made with known information about that subscriber (e.g., as within memory 440b). The control message proxy operates to ensure that multicasts are limited to known broadcasts only (e.g., as provided by an authorized or legitimate service operator/provider). If an unauthorized or illegitimate IPTV stream is provided to the network, that that unauthorized or illegitimate IPTV stream is discarded. Additional functionality may be employed by the EMS 440 and/or the SA/firewall 490 to determine if channel change requests (or other control message commands) are provided from spoofed source by leveraging MAC address checking.

Figure 5:
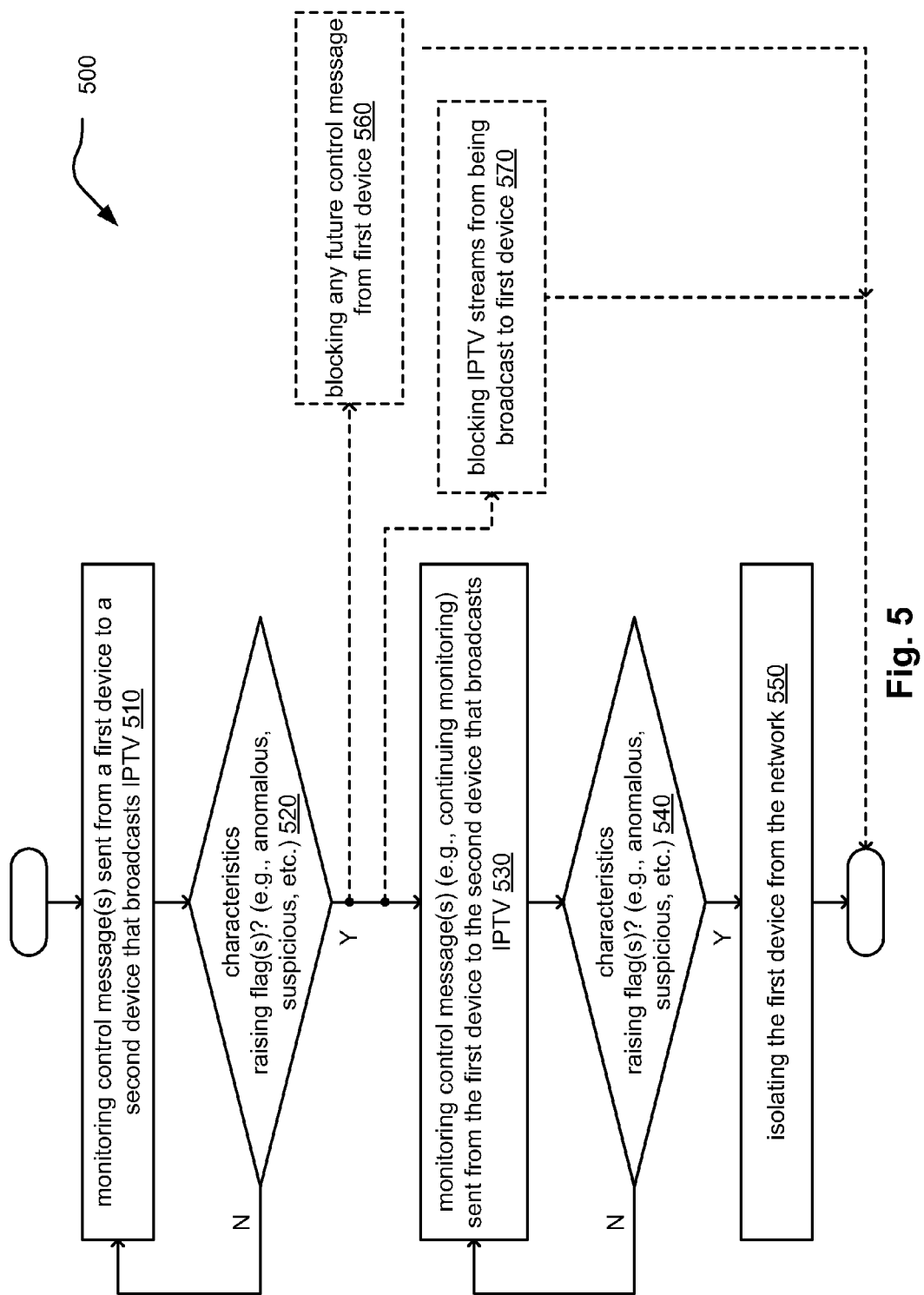
FIG. 5 is a diagram illustrating an embodiment of a method for monitoring control messages in a network that services IPTV content to effectuate network security therein.

FIG. 5 is a diagram illustrating an embodiment of a method 500 for monitoring control messages in a network that services IPTV content to effectuate network security therein. The method 500 begins by monitoring one or more control messages sent from a first device to a second device that broadcasts IPTV, as shown in a block 510.

Then, as shown in a decision block 520, the method 500 operates to determine if one of those control messages includes parameter characteristics that raise flags (e.g., anomalous, suspicious, etc.). If no flags are raised, then the method 500 continues to perform the operation in the block 510.

However, if one or more flags is raised, then the method 500 can perform any of a number of different operations. In one embodiment, the method 500 operates by blocking any future control message being sent from the first device, as shown in a block 560. Alternatively, in another embodiment, the method 500 operates by blocking one or more IPTV streams from being broadcast to the first device, as shown in a block 570.

In even another embodiment, perhaps a flag was raised but there is insufficient indication of the parameter characteristics therein as to whether or not the control message is in fact anomalous, suspicious, etc., the method 500 then operates by monitoring one or more additional control messages sent from the first device to the second device that broadcasts IPTV, as shown in a block 530.

Then, as shown in a decision block 540, the method 500 operates to determine if one of those control messages includes parameter characteristics that raise flags (e.g., anomalous, suspicious, etc.). If no flags are raised, then the method 500 continues to perform the operation in the block 530. However, if one or more flags is raised, then the method 500 operates by isolating the identified offending device form the network, as shown in a block 550.

Figure 6:
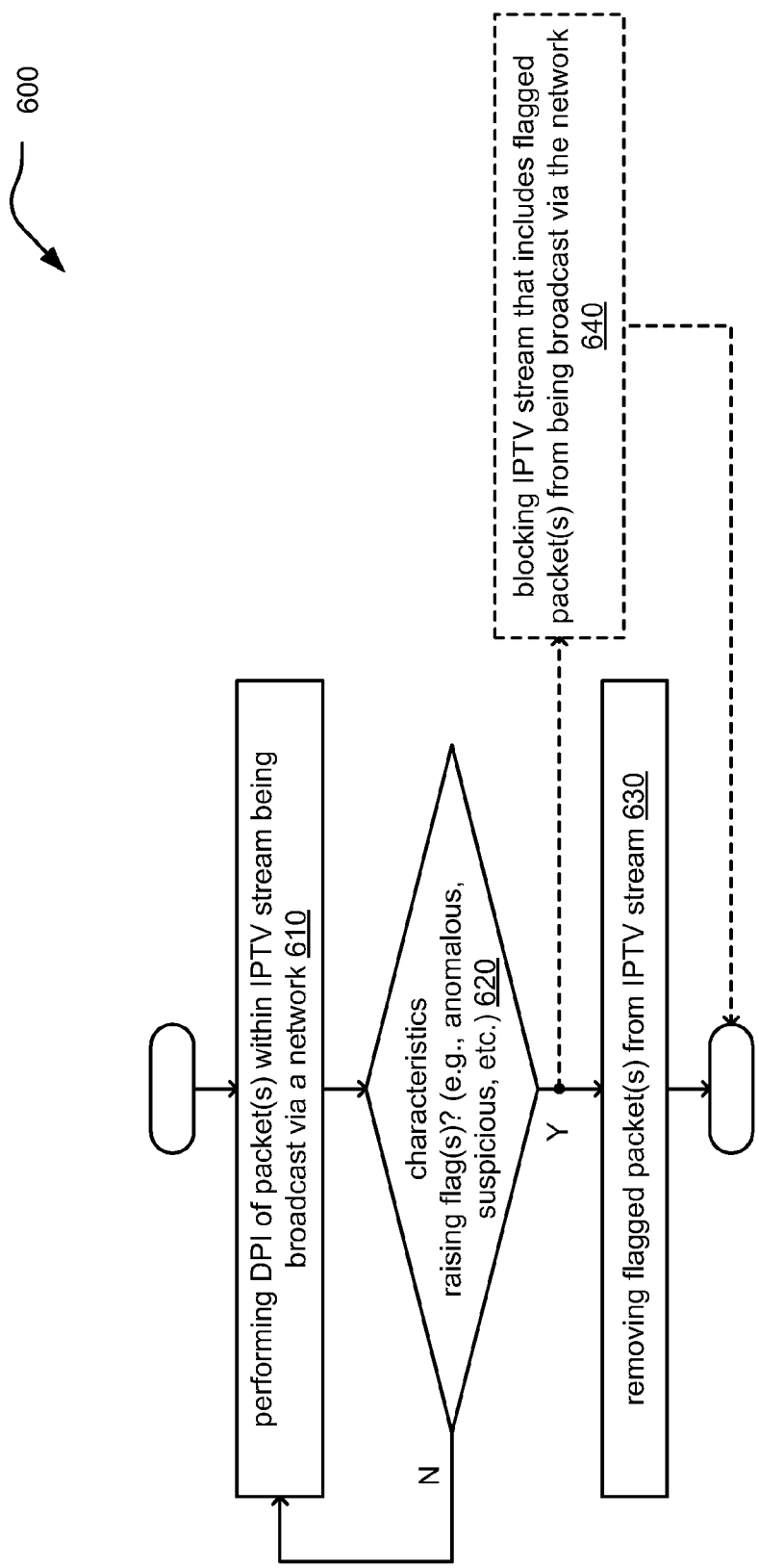
FIG. 6 is a diagram illustrating an alternative embodiment of a method for monitoring control messages in a network that services IPTV content to effectuate network security therein.

FIG. 6 is a diagram illustrating an alternative embodiment of a method 600 for monitoring control messages in a network that services IPTV content to effectuate network security therein. The method 600 begins by performing DPI of one or more packet(s) within an IPTV stream being broadcast via a network, as shown in a block 610.

Then, as shown in a decision block 620, the method 600 operates to determine if, based on the DPI, one of packets includes parameter characteristics that raise flags (e.g., anomalous, suspicious, etc.). If no flags are raised, then the method 600 continues to perform the operation in the block 610.

However, if one or more flags is raised, then the method 600 can perform any of a number of different operations. In one embodiment, the method 600 operates by blocking the IPTV stream that includes the one or more flagged packets from being broadcast via the network, as shown in a block 640. Alternatively, in another embodiment, the method 600 operates by removing the one or more flagged packets from the IPTV stream, as shown in a block 630.

It is noted that the various modules (e.g., security appliances, processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus in a network for providing a plurality of Internet protocol television (IPTV) streams, comprising:
 a memory configured to store a plurality of parameter characteristics indicative of a security breach in the network; and
 a processing module configured to:
  receive a first plurality of control messages addressed to a first multicast group from at least one network element in the network, wherein the first plurality of control messages is operably transmitted by an authorized user device in the network to a service provider device in the network and is re-addressed by the at least one network element for transmission to the first multicast group, wherein the first multicast group includes at least the apparatus and the service provider device as destinations;
  monitor the first plurality of control messages for at least one of the plurality of parameter characteristics;
  determine that the first plurality of control messages displays at least one of the plurality of parameter characteristics;
  perform at least one protective measurement that includes:
   subscribing to a second multicast group including a plurality of IPTV streams associated with the authorized user device, wherein the second multicast group includes at least the first apparatus and the service provider device as destinations;
   performing deep packet inspection (DPI) of at least one packet within at least one of the plurality of IPTV streams; and
   in the event that an anomaly within the at least one packet is detected, removing the at least one packet from the at least one of the plurality of IPTV streams.

2. The apparatus of claim 1, wherein:
 the first plurality of control message includes at least one of an Internet Group Message Protocol (IGMP) message and a Customer premise Management System (CMS) message.

3. The apparatus of claim 1, wherein the processing module is configured to determine that the at least one of the plurality of parameter characteristics in the at least one of the first plurality of control messages indicates a security breach by at least one of:
 determining a deviation of an expected number of control messages sent per unit of time from the authorized user device in the network;
 determining a deviation of an expected number of control messages sent per unit of time from an authorized residential gateway in the network;
 determining a deviation from an expected rate of re-booting of the authorized user device in the network;
 determining a deviation from an expected value of a selected bit within a control message;
 determining a deviation from an expected switch through which a control message passes from the authorized user device; and
 determining a deviation from typical usage of IPTV streams based on a history of IPTV streams received or selected by the authorized.

4. The apparatus of claim 1, wherein the processing module is configured to determine that the at least one of the plurality of parameter characteristics in the at least one of the first plurality of control messages indicates a security breach by:
 determining that the at least one of the first plurality of control messages includes indicia corresponding to virus, worm, or malware infection.

5. The apparatus of claim 1, wherein:
 in the event that the processing module detects an anomaly within the at least one packet of the plurality of IPTV streams, the processing module is further configured to block the at least one of the plurality of IPTV streams from being broadcast via the network by the service provider device.

6. The apparatus of claim 5, wherein:
 the anomaly indicates that the at least one packet is virus, worm, or malware infected.

7. The apparatus of claim 1, wherein in the event that the processing module determines at least one of the plurality of parameter characteristics in at least one of the first plurality of control messages indicates a security breach, the processing module is further configured to perform at least one of the following protective measurements:
 generate an instruction to block any future control message sent from the authorized user device;
 generate an instruction to block the plurality of IPTV streams from being broadcast to the authorized user device; and
 monitor a second plurality of control messages sent from the authorized user device to the service provider device and in the event that at least one of the second plurality of control messages includes characteristics corresponding to at least one additional of the plurality of parameter characteristics, generate an instruction to block any future control message sent from the authorized user device.

8. The apparatus of claim 1, wherein:
 each control message of the first plurality of control messages has a corresponding type, a corresponding service, a corresponding sending device, and a corresponding receiving device associated therewith;
 the first multicast group includes the first plurality of control messages having at least one of a first type, a first service, and a first receiving device associated therewith;
 a third multicast group includes a second plurality of control messages having at least one of a second type, a second service, and a second receiving device associated therewith;
 control messages of the first multicast group are received by the apparatus; and
 control messages of the third multicast group are received by at least one additional apparatus.

9. The apparatus of claim 1, wherein:
 the processing module is further configured to:
  update the plurality of parameter characteristics based on the first plurality of control messages thereby generating an updated plurality of parameter characteristics;
  monitor a second plurality of control messages for at least one of the updated plurality of parameter characteristics for determining a security breach in the network; and
  in the event that at least one of the second plurality of control messages includes characteristics corresponding to at least one of the updated plurality of parameter characteristics, isolate the authorized user device from the network.

10. The apparatus of claim 1, wherein the processing module is configured to track one or more of the following plurality of parameter characteristics:
a number of control messages sent per unit of time by the authorized user device;
a number of control messages sent per unit of time from an expected number of control messages sent per unit of time;
a re-booting process of the authorized user device;
an expected value of a selected bit within a control message;
an address of a switch through which a control message passes between the authorized user device and the service provider device; and
a history of IPTV streams received or selected by the authorized user device.

11. An apparatus in a network for providing a plurality of Internet protocol television (IPTV) streams, comprising:
a memory that stores a plurality of parameter characteristics; and
a processing module that:
monitors a first plurality of control messages sent from an authorized user device to a service provider device in the network, wherein the first plurality of control messages identifies a first multicast group that includes at least the apparatus and the service provider device as destinations and wherein at least one network element readdressed the first plurality of control messages to the first multicast group; and
in the event that at least one of the first plurality of control messages includes at least one of the plurality of parameter characteristics indicating a security breach, the processing module:
generates an instruction to isolate the authorized user device from the network;
generates an instruction to block the plurality IPTV streams from being broadcast to the authorized user device;
monitors a second plurality of control messages sent from the authorized user device to the service provider device and in the event that at least one of the second plurality of control messages includes characteristics corresponding to at least one additional of the plurality of parameter characteristics, generates an instruction to block any future control message sent from the first device; and
performs deep packet inspection (DPI) of at least one packet within at least one of the plurality of IPTV streams to the authorized user device and in the event that the processing module detects an anomaly within the at least one packet in accordance with the DPI, the processing module performs at least one of: removes the at least one packet from the at least one of the plurality of IPTV streams; and generates an instruction to block the at least one of the plurality of IPTV streams from being broadcast via the network by the second device.

12. The apparatus of claim 11, wherein:
the plurality of control message includes at least one of an Internet Group Message Protocol (IGMP) message and a Customer premise Management System (CMS) message.

13. The apparatus of claim 11, wherein:
the at least one of the plurality of parameter characteristics includes indicia corresponding to virus, worm, or malware infection.

14. The apparatus of claim 11, wherein:
the anomaly indicates that the at least one packet is virus, worm, or malware infected.

15. The apparatus of claim 11, wherein:
each control message of the first plurality of control messages has a corresponding type, a corresponding service, a corresponding sending device, and a corresponding receiving device associated therewith;
the first multicast group includes control messages having at least one of a first type, a first service, and a first receiving device associated therewith;
a second multicast group includes control messages having at least one of a second type, a second service, and a second receiving device associated therewith;
control messages of the first multicast group are received by the apparatus; and
control messages of the second multicast group are received by at least one additional apparatus.

16. The apparatus of claim 11, wherein one of the plurality of parameter characteristics includes at least one of:
a number of control messages sent per unit of time;
a deviation of the number of control messages sent per unit of time from an expected number of control messages sent per unit of time;
a re-booting process of the authorized user device;
an expected value of a selected bit within a control message;
a switch through which a control message passes between the authorized user device and the service provider device; and
a history of IPTV streams received or selected by the authorized user device.

17. A method, comprising:
receiving control messages in a first multicast group by a security device that is a member of the first multicast group, wherein the control messages are transmitted from a authorized user device to a service provider device in a network for providing a plurality of Internet protocol television (IPTV) streams via the network and wherein at least one network element readdressed the first plurality of control messages to the first multicast group;
monitoring a first plurality of the control messages by the security device;
in the event that at least one of the first plurality of control messages includes characteristics corresponding to at least one of a plurality of parameter characteristics, performing by the security device:
instructing to block any future control message sent from the first device;
instructing to block the plurality IPTV streams from being broadcast to the first device; and
monitoring a second plurality of control messages sent from the first device to the second device and instructing to isolate the first device from the network in the event that at least one of the second plurality of control messages includes characteristics corresponding to at least one additional of the plurality of parameter characteristics.

18. The method of claim 17, further comprising:
performing deep packet inspection (DPI) of at least one packet within at least one of the plurality of IPTV streams; and in the event that an anomaly is detected within the at least one packet in accordance with the DPI, providing an instruction to block the at least one of the plurality of IPTV streams from being broadcast via the network by the second device.

19. The method of claim 17, wherein:

each control message of the first plurality of control messages has a corresponding type, a corresponding service, a corresponding sending device, and a corresponding receiving device associated therewith;

a first multicast group includes control messages having at least one of a first type, a first service, and a first receiving device associated therewith;

a second multicast group includes control messages having at least one of a second type, a second service, and a second receiving device associated therewith; and further comprising:

providing control messages of the first multicast group to a first security appliance that is coupled to the network; and providing control messages of the second multicast group to a second security appliance that is coupled to the network.

20. The method of claim 17, wherein one of the plurality of parameter characteristics includes at least one of:

a number of control messages sent per unit of time;

a deviation of the number of control messages sent per unit of time from an expected number of control messages sent per unit of time;

a re-booting process of the first device;

an expected value of a selected bit within a control message;

an address of a switch through which a control message passes between the authorized user device and the service provider device; and a history of IPTV streams received or selected by the authorized user device.

* * * * *